United States Patent [19]

Saito

[11] Patent Number: 5,448,588
[45] Date of Patent: Sep. 5, 1995

[54] DATA TRANSMISSION CIRCUIT CAPABLE OF AVOIDING REPEATED RECEPTION AND TRANSMISSION OF AN IDENTICAL TRANSMISSION SIGNAL

[75] Inventor: Shigeaki Saito, Tokyo, Japan

[73] Assignee: NEC Corporation, Japan

[21] Appl. No.: 842,719

[22] Filed: Feb. 27, 1992

[30] Foreign Application Priority Data

Feb. 27, 1991 [JP] Japan .................. 3-032552

[51] Int. Cl.⁶ ......................... H04L 12/28
[52] U.S. Cl. ................. 375/224; 340/825.05; 370/15; 370/16.1; 370/85.15; 371/20.5; 371/20.6
[58] Field of Search ............ 370/85.5, 85.12, 85.15, 370/13, 13.1, 15, 16, 16.1; 340/825.05; 375/7–8, 10, 35–36, 121; 371/15.1, 20.4, 20.5, 20.6, 67.1, 69.1

[56] References Cited

U.S. PATENT DOCUMENTS

| | | | |
|---|---|---|---|
| 4,593,154 | 6/1986 | Takeda et al. | 370/16 |
| 4,637,014 | 1/1987 | Bell et al. | 340/825.05 |
| 4,855,998 | 8/1989 | Kishimoto | 340/825.05 |
| 4,899,142 | 2/1990 | Nakayashiki et al. | 370/85.15 |
| 5,119,373 | 6/1992 | Fredricsson et al. | 370/85.15 |
| 5,161,151 | 11/1992 | Kimura et al. | 370/13 |
| 5,282,224 | 1/1994 | Harada | 375/10 |
| 5,386,416 | 1/1995 | Neth | 370/13.1 |

Primary Examiner—Young Tse
Attorney, Agent, or Firm—Ostrolenk, Faber, Gerb & Soffen

[57] ABSTRACT

In a transmission system comprising a plurality of data transmission circuits connected through a transmission line to form a loop, a local transmission signal is transmitted from a selected one of the data transmission circuits to the other data transmission circuits through the transmission line to be returned back to the selected data transmission circuit. The selected data transmission circuit interrupts the local transmission signal by detecting an identification signal preassigned to the selected data transmission circuit in a signal selecting circuit and by putting a switch circuit into an off-state during the local transmission signal sent from the selected data transmission circuit.

4 Claims, 5 Drawing Sheets

DATA TRANSMISSION CIRCUIT CAPABLE OF AVOIDING REPEATED RECEPTION AND TRANSMISSION OF AN IDENTICAL TRANSMISSION SIGNAL

BACKGROUND OF THE INVENTION

This invention relates to a data transmission circuit for use in transmitting a local transmission signal through a transmission line of a loop type and to a transmission system which comprises a plurality of the data transmission circuits connected through a loop-shaped transmission line.

In a conventional system of the type described, a plurality of data transmission circuits are connected to a loop-shaped transmission line at multipoints. Each data transmission circuit unidirectionally transmits a local transmission signal through the transmission line. When an order wire signal is transmitted as the local transmission signal from a selected or reference one of the data transmission circuits to all of the remaining data transmission circuits, through the loop-shaped transmission line, the order wire signal is returned back to the selected data transmission circuit. This is because no destination address is included in such a local transmission signal. In this event, the same local transmission signal is cyclically and repeatedly transmitted through the loop-shaped transmission line and is repeatedly received by the selected data transmission circuit in which such a local transmission signal is unnecessary. Such repeated reception and transmission of the same local transmission signal should be avoided in the transmission system and, otherwise, any local transmission signals can not be transmitted to the transmission line.

SUMMARY OF THE INVENTION

It is an object of this invention to provide a transmission system which is capable of avoiding repeated reception and transmission of an identical local transmission signal.

It is another object of this invention to provide a data transmission circuit which is used in the transmission system mentioned above.

A data transmission circuit to which this invention is applicable responds to a sequence of input signals through a loop-shaped transmission line to successively produce a local transmission signal one after another, and to transmit the local transmission signal in the form of a sequence of output signals to the transmission line. The local transmission signal is returned back to the data transmission circuit as a part of the input signal sequence through the transmission line. According to this invention, the data transmission circuit comprises a detector supplied with the input signal sequence for detecting whether the local transmission signal is included in the input signal sequence to produce a detection signal representative of detection of the local transmission signal, a selector supplied with the input signal sequence and the detection signal for selecting the local transmission signal from the input signal sequence to interrupt the local transmission signal in response to the detection signal and, otherwise, to allow the remaining input signal to pass therethrough as an internal input signal sequence from which the local transmission signal is removed, a divider supplied with the internal input signal sequence for dividing the internal input signal sequence into first and second internal input signal sequences both of which are identical with the internal input signal sequence, and a combiner for combining the second internal input signal sequence and another local transmission signal to produce the output signal sequence.

DESCRIPTION OF THE PREFERRED EMBODIMENTS

Figure 1:
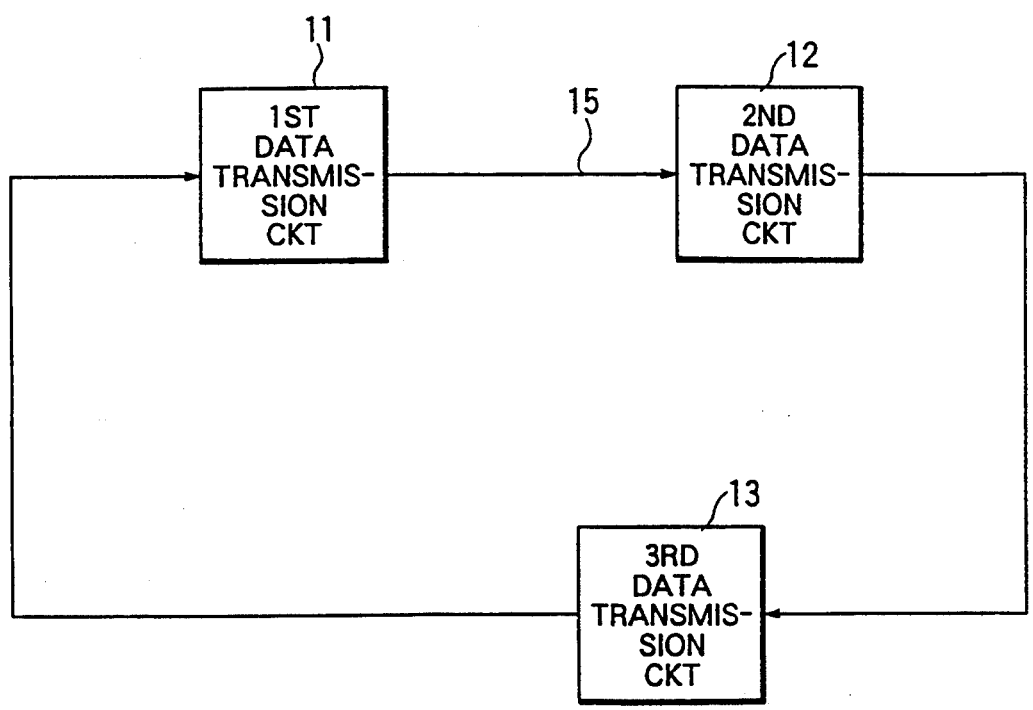
FIG. 1 is a block diagram of a transmission system to which this invention is applicable.

Referring to FIG. 1, a transmission system is exemplified for describing structure and operation of a conventional transmission system and a transmission system according to this invention. In the illustrated example, the transmission system comprises first, second, and third data transmission circuits 11, 12, and 13 which are similar in structure and operation to one another and which are connected to one another through a loop-shaped transmission line 15. As a result, the first through the third transmission circuits 11 to 13 forms a ring-shaped system. Each of the first through the third transmission circuits 11 to 13 unidirectionally transmits a local transmission signal in the form of a sequence of output signals through the transmission line 15 downstream, as suggested by arrows.

Let the local transmission signal, such as an order wire signal, be sent from the first data transmission circuit 11 downwards of FIG. 1 as the output signal sequence. Such an order wire signal should be delivered to all of the remaining data transmission circuits 12 and 13 and is returned back to the first data transmission circuit 11 through the second and the third data transmission circuits 12 and 13 through the transmission line 15. In this event, each of the first through the third data transmission circuits 11 to 13 receives the output signal sequence as a sequence of input signals and transmits the input signal sequence to the transmission line 15 without separation of the local transmission signal, such as the order wire signal.

Figure 2:
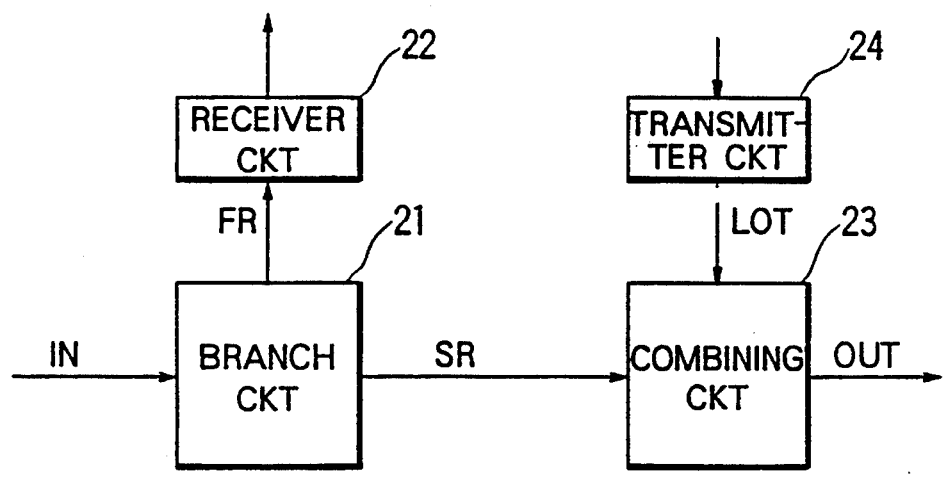
FIG. 2 is a block diagram of a conventional data transmission circuit usable in the transmission system illustrated in FIG. 1.

Referring to FIG. 2 together with FIG. 1, a conventional data transmission circuit depicted by 1i in FIG. 2 is usable as the first through the third data transmission circuits 11 to 13 where i represents a natural number. The illustrated data transmission circuit 1i is operable in response to the input signal sequence represented by IN to produce a sequence of output signals OUT. Specifically, the data transmission circuit 1i comprises a separator 21 which divides or branches the input signal sequence IN into a first reception signal FR and a second reception signal SR both of which are identical with the input signal sequence IN.

The first reception signal FR is delivered to a receiver circuit 22 to be sent to an internal circuit (not shown) as an internal signal. The internal circuit separates a destined one of the input signal sequence destined to the data transmission circuit 1i.

On the other hand, the second reception signal SR is delivered to a combining circuit 23 to which a local transmission signal LOT, such as an order wire signal, is given from a transmitter circuit 24. The transmitter circuit 24 is operable in a manner known in the art and will not be described any longer.

The local transmission signal LOT is combined with the second reception signal SR by the combining circuit 23 into the output signal sequence.

When each of the first through the third data transmission circuits 11 to 13 illustrated in FIG. 1 is similar in structure and operation to that illustrated in FIG. 2, the local transmission signal LOT is returned back to the illustrated data transmission circuit 1i through the transmission line 15, as shown in FIG. 1. With this structure, the same local transmission signal LOT is repeatedly received and transmitted by the data transmission circuit 1i. Such repeated reception and transmission of the same local transmission signal LOT make it impossible to transmit any other local transmission signals from the data transmission circuit 1i, as pointed out in the preamble of the instant specification.

Figure 3:
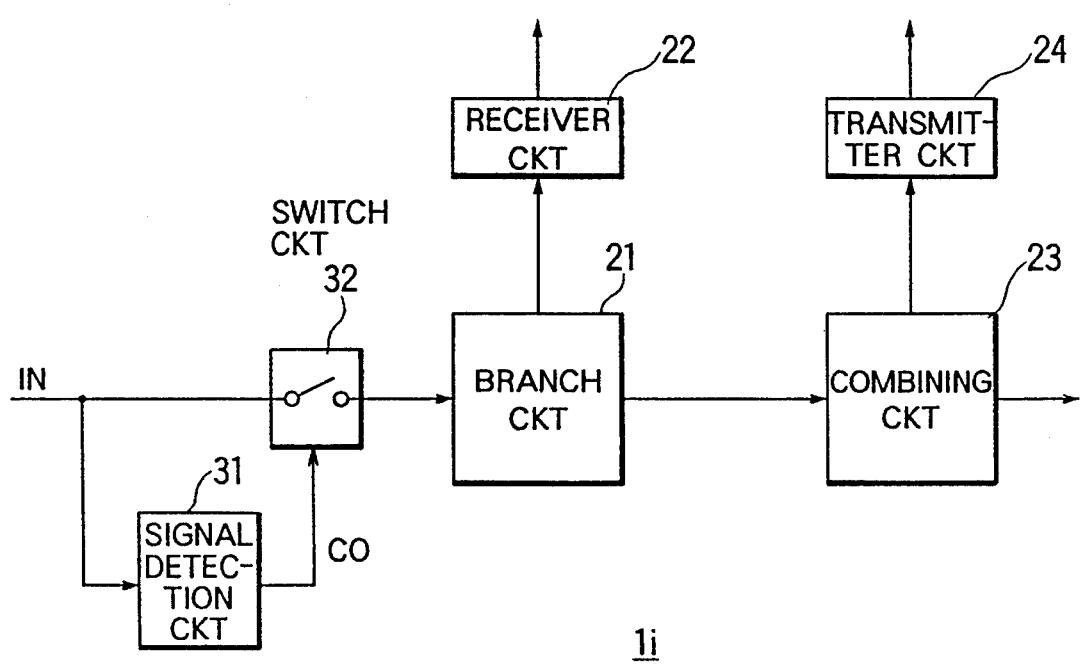
FIG. 3 is a block diagram of a data transmission circuit according to a preferred embodiment of this invention.

Referring to FIG. 3 in addition to FIG. 1, a data transmission circuit 1i according to a preferred embodiment of this invention is usable as each of the first through the third data transmission circuits 11 to 13 (FIG. 1) and is capable of avoiding repeated transmission and reception of an identical local transmission signal sent from the same data transmission circuit 1i. The illustrated data transmission circuit 1i is similar in structure to that illustrated in FIG. 2 except that a signal detection circuit 31 and a switch circuit 32 are included in the illustrated data transmission circuit 1i shown in FIG. 3. As is apparent in FIG. 3, the switch circuit 32 is switched on or off under control of the signal detection circuit 31. Also apparent from FIG. 3, transmitter circuit 24 is located downstream of the switch circuit 32 and is connected to the combining circuit 23. Thus, the transmitter circuit 24 can always transmit a local data transmission signal, regardless of whether the switch circuit 32 is switched on or off.

Figure 4:
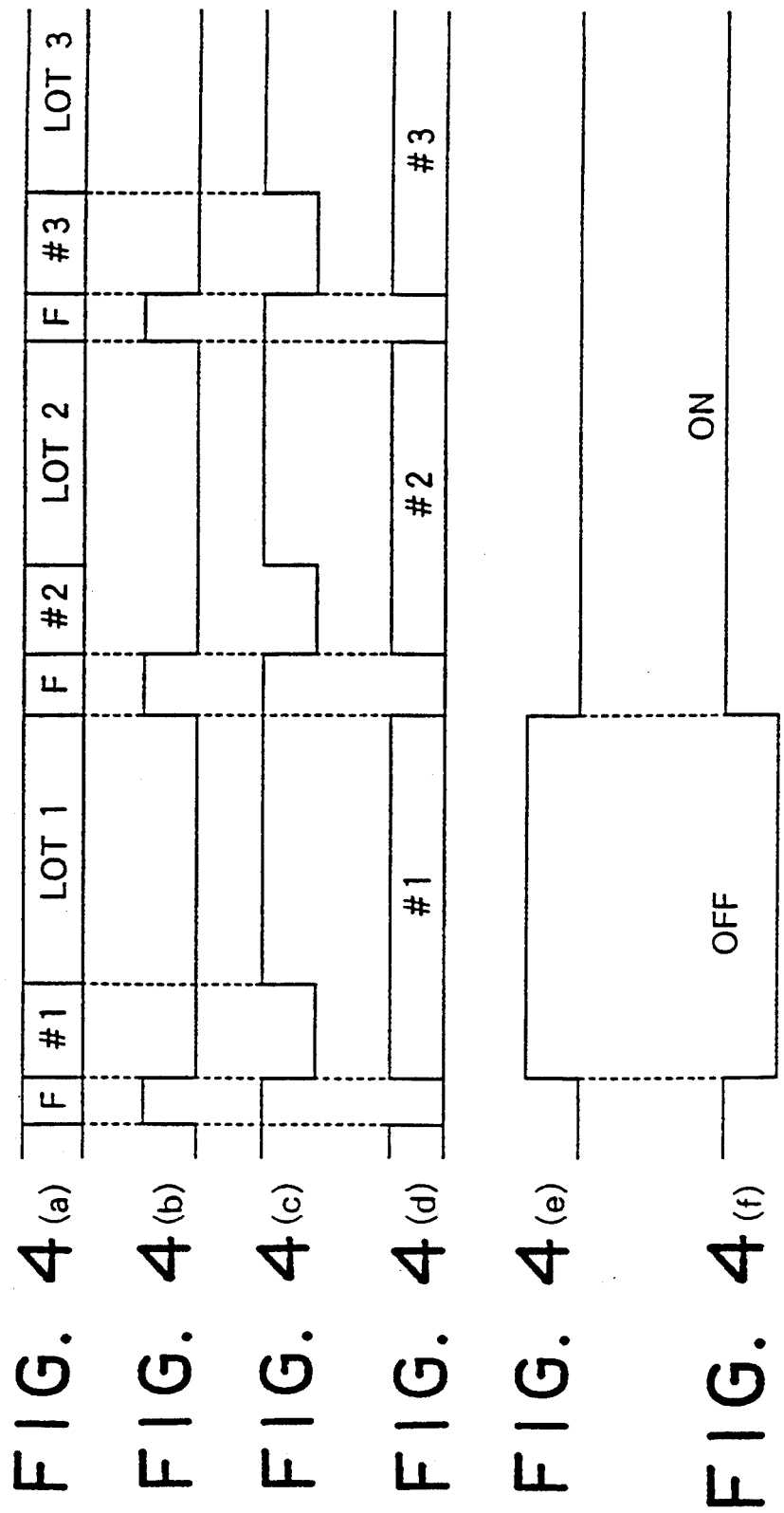
FIGS. 4a–4f are time charts for use in describing operation of the data transmission circuit illustrated in FIG. 3.

Temporarily referring to FIG. 4 together with FIG. 1, each of the first through the third data transmission circuits 11 to 13 is supplied with the input signal sequence which has a signal format, as illustrated in FIG. 4(a). Herein, it is assumed that the input signal sequence has a succession of frames each of which is repeated at every frame period and which is preceded by a frame synchronization signal F and that each frame is assigned to each of the first through the third data transmission circuits 11 to 13. Consequently, the frame synchronization signal F is produced at every frame period by a predetermined one of the first through the third data transmission circuits 11 to 13 that is operable as a reference data transmission circuit and that may be, for example, the first data transmission circuit 11.

As shown in FIG. 4(a), the frame synchronization signals F are followed by first through third identification signals #1, #2, and #3 preassigned to the first through the third data transmission circuits 11 to 13 to identify them, respectively. The first through the third identification signals #1 to #3 are succeeded by first through third local transmission signals LOT1 to LOT3 sent from the first through the third data transmission circuits 11 to 13, respectively. Herein, it is surmised that the first local transmission signal LOT1 is to be received by both the second and the third data transmission circuits 12 and 13 and the second and the third local transmission signals LOT2 and LOT3 should be delivered to both the third and the first data transmission circuits 13 and 11 and to both the first and the second data transmission circuits 11 and 12, respectively.

Figure 5:
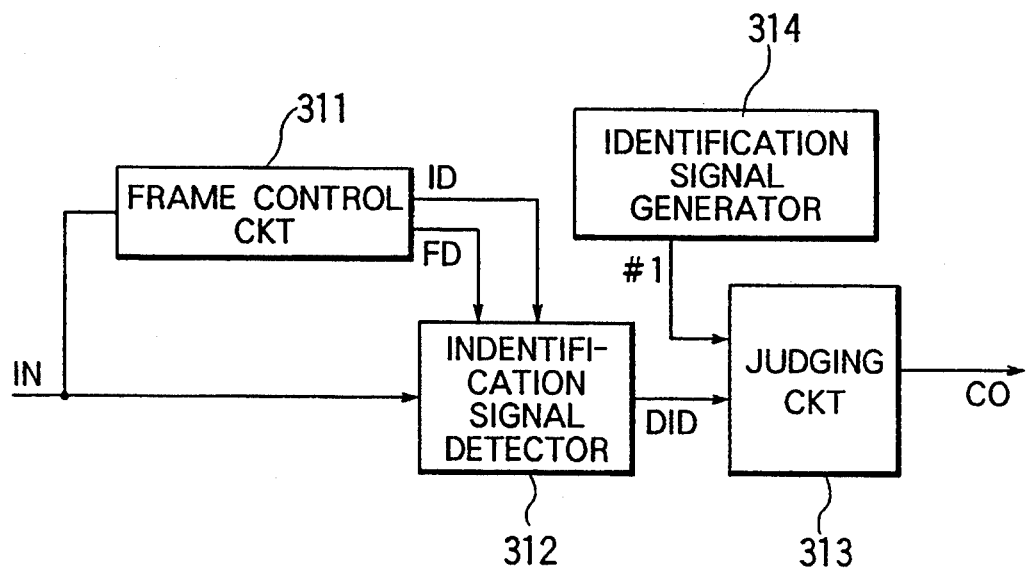
FIG. 5 is a block diagram of a signal detection circuit used in the data transmission circuit illustrated in FIG. 3.

Referring to FIG. 5 together with FIGS. 3 and 4(a)–4(f), the data transmission circuit 1i illustrated in FIG. 3 is assumed to be used as the first data transmission circuit 11 (FIG. 1) for brevity of description. In FIG. 5, the signal detection circuit 31 in the data transmission circuit 1i comprises a frame control circuit 311 supplied with the input signal sequence IN to detect the frame synchronization (SYNC) signal F and to produce a frame detection signal FD at every frame, as shown in FIG. 4(b). Thereafter, the frame control circuit 311 further produces an identification time signal ID representative of an identification time of each of the first through the third identification signals #1 to #3, as illustrated in FIG. 4(c). The identification time lasts for a predetermined duration after arrival of each of the frame synchronization signals F. Supplied with the frame detection signal FD followed by the identification time signal ID, an identification signal detector 312 is energized after detection of the identification time signal ID to detect each of the first through the third identification signals #1 to #3 and to produce a detected identification signal DID which lasts for each frame, as shown in FIG. 4(d).

The detected identification signal DID is sent from the identification signal detector 312 to a judging circuit 313 which is supplied with the first identification signal #1 from an identification signal generator 314. When the detected identification signal DID is coincident with the first identification signal #1, the judging circuit 312 supplies the switch circuit 32 with a coincidence signal CO indicative of coincidence between the detected identification signal DID and the first identification signal #1, as illustrated in FIG. 4(e). Otherwise, an incoincidence signal ICO is produced from the judging circuit 313.

Responsive to the coincidence signal CO, the switch circuit 32 is turned into an off-state, as illustrated in FIG. 4(f), and lasts for the frame assigned to the first data transmission circuit 11. After the coincidence signal CO is extinct, the switch circuit 32 is turned into an on-state. Therefore, the remaining input signal sequence except for the frame assigned to the first data transmission circuit 11 allows the switch circuit 32 to pass therethrough and is delivered to the branch circuit 21 to be processed in a manner similar to that illustrated in conjunction with FIG. 2.

While this invention has thus far been described in conjunction with a preferred embodiment thereof, it will readily be possible for those skilled in the art to put this invention into practice in various other manners. For example, the transmission system may comprise a great number of data transmission circuits which are different in structure and operation from one another.

What is claimed is:

1. A data transmission circuit for responding to a sequence of input signals through a loop-shaped transmission line to produce a local transmission signal preceded by an identification signal preassigned to said data transmission circuit and to transmit said local transmission signal in the form of a sequence of output signals to said loop-shaped transmission line, said local transmission signal being returned back to said data transmission circuit as a part of said sequence of input signals through said loop-shaped transmission line together with said identification signal preceding said local transmission signal, said sequence of input signals including a frame signal which precedes the identification signal and which appears at a predetermined frame period, said data transmission circuit comprising:

a) detecting means supplied with said sequence of input signals for detecting whether said local transmission signal is included in said sequence of input signals by monitoring reception of said identification signal to produce a detection signal representative of detection of the local transmission signal on reception of said identification signal, said detecting means including:
 1) signal producing means supplied with said sequence of input signals for detecting said frame signal to determine a time interval assigned to said identification signal and to produce an identification time signal indicative of said time interval;
 2) identification signal detecting means supplied with said sequence of input signals and said identification time signal for detecting the identification signal as a detected identification signal from said sequence of input signals during said time interval;
 3) identification signal producing means for producing a reference identification signal preassigned to said data transmission circuit; and
 4) comparing means for comparing said detected identification signal with said reference identification signal to produce said detection signal when said detected identification signal is coincident with said reference identification signal;

b) selecting means supplied with said sequence of input signals and said detection signal for selecting the local transmission signal from said sequence of input signals to interrupt said local transmission signal by disconnecting said loop-shaped transmission line in response to said detection signal and to allow the remaining input signal to pass therethrough as an internal input signal from which said local transmission signal is removed;

c) dividing means supplied with said internal input signal for dividing said internal input signal into first and second internal input signals both of which are identical with said internal input signal; and d) combining means for combining said second internal input signal and another local transmission signal to produce said sequence of output signals.

2. The data transmission circuit as claimed in claim 1, wherein when said selecting means interrupts said local transmission signal by disconnecting said loop-shaped transmission line in response to said detection signal, the data transmission circuit transmits a following local transmission signal to the loop-shaped transmission line.

3. A data transmission system comprising a plurality of data transmission circuits connected to one another through a loop-shaped transmission line, each of said data transmission circuits receiving a sequence of input signals and transmitting through said loop-shaped transmission line a local transmission signal in the form of a sequence of output signals which is preceded by an identification signal preassigned to a respective data transmission circuit, said local transmission signal being returned back to each of the data transmission circuits and being preceded by the identification signal preassigned to each of the data transmission circuits, said sequence of input signals including a frame signal which precedes the identification signal and which appears at a predetermined frame period, each of said data transmission circuits comprising:

a) detecting means supplied with said sequence of input signals for detecting whether said local transmission signal is included in said sequence of input signals by monitoring reception of the identification signal preassigned to each of the data transmission circuits to produce a detection signal representative of detection of the local transmission signal only when said local transmission signal is included in said sequence of input signals, said detecting means including:
 1) signal producing means supplied with said sequence of input signals for detecting said frame signal to determine a time interval assigned to said identification signal and to produce an identification time signal indicative of said time interval;
 2) identification signal detecting means supplied with said sequence of input signals and said identification time signal for detecting the identification signal as a detected identification signal from said sequence of input signals during said time interval;
 3) identification signal producing means for producing a reference identification signal preassigned to one of said data transmission circuits; and
 4) comparing means for comparing said detected identification signal with said reference identification signal to produce said detection signal when said detected identification signal is coincident with said reference identification signal;

b) selecting means supplied with said sequence of input signals and said detection signal for selecting the local transmission signal from said sequence of input signals to interrupt said local transmission signal by disconnecting said loop-shaped transmission line in response to said detection signal and to allow the remaining input signal to pass therethrough as an internal input signal from which said local transmission signal is removed;

c) dividing means supplied with said internal input signal for dividing said internal input signal into first and second internal input signals both of which are identical with said internal input signal; and d) combining means for combining said second internal input signal and another local transmission signal to produce said sequence of output signals.

4. The data transmission system as claimed in claim 3, wherein when said selecting means interrupts said local transmission signal by disconnecting said loop-shaped transmission line in response to said detection signal, one of said data transmission circuits transmits a following local transmission signal to the loop-shaped transmission line.

* * * * *